United States Patent Office 3,228,918
Patented Jan. 11, 1966

3,228,918
PROCESS FOR IMPROVING THE STIFFNESS OF A FILM OF ETHYLENE/1,3-BUTADIENE COPOLYMER AND THE RESULTING PRODUCT
Stanley Tocker, Wilmington, Del., assignor to E. I. du Pont de Nemours and Company, Wilmington, Del., a corporation of Delaware
No Drawing. Filed Jan. 4, 1961, Ser. No. 80,536
5 Claims. (Cl. 260—85.3)

This invention relates to polyolefin films. More specifically, it relates to films of ethylene copolymers and in particular to a method of improving the functional characteristics of such copolymer films.

Films of polyethylene have many properties such as high tear strength, high elongation and other durability characteristics which make them well suited for diverse applications in the packaging field. However, these films have a serious drawback which handicaps their acceptance in the large volume packaging field in that they do not have adequate stiffness for good operation on existing packaging machines and for various other operations requiring high speed machine operability. Attempts have been made to improve these films through such alternatives as copolymerization but in general these approaches have not been especially successful.

Accordingly, it is an object of this invention to provide a method for improving the stiffness and tenacity characteristics of ethylene copolymer films while retaining essentially the other desirable characteristics of the film such as those bearing on durability and permeability. Other objects will appear hereinafter.

These objects are accomplished by the instant invention which comprises a process for improving the stiffness and tenacity characteristics of a film of an essentially linear ethylene/1,3-alkadiene copolymer, wherein said copolymer contains from 0.5 to 10 mole percent 1,3-alkadiene, which comprises irradiating said film with ultraviolet light in an oxygen-containing atmosphere to produce carbonyl groups in said film in an amount to provide a carbonyl intensity as measured by infrared absorption of from 1 to 9.

Preferably, the 1,3-alkadiene is 1,3-butadiene; however, 1,3-pentadiene, 1,3-hexadiene, and 1,3-heptadiene are additional examples of operable alkadienes. When 1,3-butadiene is used it is preferably 3 to 6 mole percent of the copolymer. In the preferred embodiment, the copolymer is prepared with a coordination catalyst system such as vanadyl trichloride/aluminum triisobutyl and formed into a film by pressing or by melt extrusion.

The process of this invention is conducted to produce carbonyl groups in the copolymer within the specified limits of carbonyl intensity as measured by infrared absorption. A range of carbonyl intensity of from 2 to 6 is preferred. The carbonyl intensity is determined by measuring the intensity of infrared absorption at approximately 1690 cm.$^{-1}$. It is defined as:

carbonyl intensity =
$$\frac{\text{absorbance (at 1690 cm.}^{-1}) \times 100}{\text{thickness (mils)}}$$

Various means known to those skilled in the art can be used for the source of ultraviolet irradiation, e.g., a General Electric AH–6 mercury lamp.

Some of the terms utilized in describing this invention are defined as follows:

The tensile strength or tenacity of the film structure is based upon the initial cross-sectional area of the sample. Tenacity at break is determined by elongating the film sample at a rate of 5% per minute or less until the film sample breaks.

Initial tensile modulus is a measure of film stiffness, i.e., the higher the modulus the greater the stiffness, and the modulus is the slope of the initial portion of the stress/strain curve at 1% elongation, the film being elongated at a rate of 5% per minute or less.

Pneumatic impact strength is the energy required to rupture a film. It is reported in kilograms-centimeters/mil of thickness of the film sample. Pneumatic impact strength is determined by measuring the velocity of a ball mechanically accelerated by air pressure, first in free flight and then in flight immediately after being impeded by rupturing the test film sample. In this test the film sample is 1¾″ x 1¾″. The projectiles are steel balls ½″ in diameter and weighing 8.3 grams. The free flight ball velocity is 40±2 meters/second. The velocities are measured by timing photoelectrically the passage of the steel balls between two light beams set a definite distance apart. The pneumatic impact strength is measured by the loss in kinetic energy of the ball due to the rupturing of the film sample. It is calculated from the following formula:

constant × (square of velocity in free flight
—square of velocity in impeded flight)

where the constant is directly proportional to the weight of the projectile and inversely proportional to the acceleration due to gravity. This test is carried out at 23° C. and 50% relative humidity, and the test samples are conditioned for 24 hours at 23° C. and 50% relative humidity.

Elongation is measured by elongating a ¼″ wide film at a rate of 100% per minute until the sample breaks. Elongation is the precent increase in length of the sample at breakage. The test is likewise carried out at 23° C. and 50% relative humidity and the samples are conditioned for 24 hours before testing.

Inherent viscosity is defined by L. H. Cragg, J. of Colloid Science, I, 261–269 (1946).

$$\text{Inherent viscosity} = \frac{\ln N_r}{c}$$

wherein "ln" is the natural logarithm, "$N_r$" is the viscosity of the solution relative to the solvent and "$c$" is the concentration expressed in grams of solute/100 ml. of solvent.

*Example I*

To 1.0 liter of stirred chlorobenzene, purified by distillation over calcium hydride, there was added under nitrogen 5 ml. (5 millimoles) of vanadyl chloride ($VOCl_3$) and 12 ml. (12 millimoles) of 1.0 M aluminum triisobutyl. The nitrogen flow was stopped and there was then passed into the reactor simultaneously ethylene at 0.01 mole per minute and butadiene at 0.0005 mole per minute while the reactor was held at 5° C. to 10° C. The reaction was carried out for three hours after which the product was washed successively in an Osterizer with: (a) 3% concentration hydrochloric acid in methanol, (b) 20% water in methanol and (c) methanol, and then dried at 50° C. in a vacuum oven.

Infrared analysis showed the copolymer to contain approximately 5 mole percent of butadiene units based on absorption at 965 cm.$^{-1}$, characteristic of trans in-chain unsaturation. The copolymer showed an inherent viscosity of 3.9, when measured at 0.1% solids in alpha-chloronaphthalene at 150° C.

For the next step, the ethylene/butadiene (5 mole percent butadiene) was pressed into film form at 150° C., using 30 tons pressure on a one square inch sample. A sample of the film was placed two inches from a General Electric AH–6 mercury lamp and exposed for two hours. The resulting film showed a modulus of 144,000 pounds per square inch and a tensile strength of 6,100 pounds per square inch. A control ethylene/butadiene copolymer film which had not been irradiated showed a modulus of only 83,000 pounds per square inch and a tensile strength of 4,300 pounds per square inch. A second control film made from a sample of linear polyethylene prepared by the same polymerization process as used for the copolymer likewise had a modulus of only 83,000 pounds per square inch and tensile strength of 4,000 pounds per square inch.

*Example II*

The following example illustrates the effect of exposure time on the relative carbonyl intensity as measured by infrared. A sample of ethylene/butadiene copolymer containing 5 mole percent of butadiene was exposed in film form to the same source of ultraviolet light as described in Example I. The results are as follows:

| Time of Exposure | Relative Carbonyl Intensity (1,690 cm.$^{-1}$) |
|---|---|
| Unexposed | |
| 0.5 hour | 2.5 |
| 1.0 hour | 6.5 |
| 1.5 hours | 8.6 |

*Example III*

The following illustrates the effect of ultraviolet irradiation in different atmospheres. For this experiment, a sample of the ethylene/butadiene copolymer film was prepared as described in Example I. The films were then submitted to the action of ultraviolet light for two hours each under the different atmospheres shown in the following table.

| Treatment | Modulus (1,000 p.s.i.) | Tenacity (1,000 p.s.i.) |
|---|---|---|
| Control | 83 | 4.3 |
| UV—Air | 144 | 6.1 |
| UV—Nitrogen | 90 | 2.7 |
| UV—Carbon Dioxide | 49.5 | 3.7 |
| UV—Chlorine | 67.5 | 3.3 |
| Cl$_2$—Dark | 69 | 3.1 |

It can be seen from the above table that an oxygen-containing atmosphere is necessary to realize the objects of the invention.

*Example IV*

This example illustrates the effect of exposure time to ultraviolet irradiation on film properties. Film for this experiment was prepared from an ethylene/butadiene copolymer containing approximately 3 mole percent of the butadiene units. The film was subjected to the action of ultraviolet light in a source such as is described in Example I. The results are shown in the following table:

| Exposure (hours) | Modulus (1,000 p.s.i.) | Tenacity (1,000 p.s.i.) | Pneumatic Impact (kg.-cm./mil) | Elongation, percent | Carbonyl Intensity |
|---|---|---|---|---|---|
| None | 59.2 | 2.9 | 1.3 | 190 | |
| 0.5 | 72.4 | 3.3 | 2.3 | 225 | 2.0 |
| 1.0 | 111 | 2.9 | 1.8 | 195 | 4.3 |
| 1.5 | 108 | 2.7 | 1.3 | 75 | 6.5 |
| 2.0 | 202 | 0.8 | 0.2 | 1.5 | >8 |
| 2.5 | 150 | | | | >8 |

With the exception of the products exposed for 2.5 hours, all were readily soluble in organic solvents such as toluene or xylene, indicating absence of cross-linking. A control film without any treatment and test films exposed for 0.5 hour and 1.0 hour, respectively, showed essentially the same permeability values.

The main advantage of this invention is that it provides a predominantly polyethylene film with high stiffness and tenacity along with an acceptable level of other desired properties. The advantage of such a balance of properties in a film to be used in automatic packaging machines and the like is at once apparent.

What is claimed is:

1. Process for improving the stiffness and tenacity characteristics of a film of an essentially linear ethylene/1,3-alkadiene copolymer prepared in the presence of a Ziegler catalyst at a temperature under about 10° C., wherein said copolymer contains from 0.5 to 10 mole percent 1,3-alkadiene, which comprises irradiating said film with ultraviolet light in an oxygen-containing atmosphere to produce carbonyl groups in said film in an amount to provide a carbonyl intensity as measured by infrared absorption of from 1 to 9.

2. Process for improving the stiffness and tenacity characteristics of a film of an essentially linear ethylene/1,3,-butadiene copolymer prepared in the presence of a Ziegler catalyst at a temperature under about 10° C., wherein said copolymer contains from 3 to 6 mole percent 1,3-butadiene, which comprises irradiating said film with ultraviolet light in an oxygen-containing atmosphere to produce carbonyl groups in said film in an amount to provide a carbonyl intensity as measured by infrared absorption of from 2 to 6.

3. Film of an essentially linear ethylene/1,3-alkadiene copolymer prepared in the presence of a Ziegler catalyst at a temperature under about 10° C. having improved stiffness and tenacity, wherein said copolymer contains from 0.5 to 10 mole percent polymerized 1,3-alkadiene units and which has been irradiated with ultra-violet light in the presence of oxygen so as to contain carbonyl groups in an amount to provide a carbonyl intensity as measured by infrared absorption of from 1 to 9.

4. Film according to claim 3 wherein said 1,3-alkadiene is 1,3-butadiene and said carbonyl intensity is from 3 to 6.

5. Film according to claim 4 wherein said film has an initial tensile modulus greater than 100,000 p.s.i.

References Cited by the Examiner

UNITED STATES PATENTS

| | | | |
|---|---|---|---|
| 2,469,788 | 5/1949 | Rust | 260—63 |
| 2,476,000 | 7/1949 | Sparks et al. | 260—85.3 |
| 2,560,164 | 7/1951 | Garber | 260—85.3 |
| 2,878,176 | 3/1959 | Golub | 204—162 |
| 2,924,561 | 2/1960 | Schmerling | 204—162 |
| 2,968,650 | 1/1961 | Baxter et al. | 260—85.3 |
| 3,014,799 | 12/1961 | Oster | 260—94.9 |
| 3,055,875 | 9/1962 | Walther | 260—85.3 |

OTHER REFERENCES

Raff et al.: "Polyethylene," Interscience Publishers Ltd., London, 1956, pp. 114–118.

JOSEPH L. SCHOFER, *Primary Examiner.*

J. R. SPECK, L. J. BERCOVITZ, *Examiners.*